United States Patent [19]
Beeks

[11] Patent Number: 6,104,969
[45] Date of Patent: Aug. 15, 2000

[54] METHODS AND APPARATUS FOR OPERATING AN INPUT DEVICE IN A TURBULENT ENVIRONMENT

[75] Inventor: Douglas W. Beeks, Phoenix, Ariz.

[73] Assignee: Honeywell International Inc., Morristown, N.J.

[21] Appl. No.: 09/222,900

[22] Filed: Dec. 30, 1998

[51] Int. Cl.[7] .......................... G06F 3/033; G06F 19/00
[52] U.S. Cl. .................. 701/1; 701/36; 345/157
[58] Field of Search .............................. 701/1, 36, 4, 10; 345/157, 160, 161, 163, 167, 168, 173; 250/203.1; 713/600

[56] References Cited

U.S. PATENT DOCUMENTS

| | | | |
|---|---|---|---|
| 4,354,102 | 10/1982 | Burns et al. | 250/203.1 |
| 5,051,735 | 9/1991 | Furukawa | 701/1 |
| 5,774,357 | 6/1998 | Hoffberg et al. | 713/600 |
| 5,956,019 | 9/1999 | Bang et al. | 345/157 |
| 6,020,876 | 2/2000 | Rosenberg et al. | 345/157 |

*Primary Examiner*—Gary Chin

[57] ABSTRACT

An apparatus and a method are provided for processing a user input that is used to drive cursor movement on a display in a vehicle that is operating in a turbulent environment. The apparatus includes an input device configured to receive the user input and generate an input device output signal. The apparatus also has a sensing device that is configured to detect motion of the vehicle and generate a motion signal representing the vehicle motion. A turbulence controller is provided for receiving the input device output signal and evaluating the motion signal. The turbulence controller alters the input device output signal based at least in part upon the evaluation of the motion signal such that a compensated output signal is created for driving the cursor movement on the display.

18 Claims, 3 Drawing Sheets

METHODS AND APPARATUS FOR OPERATING AN INPUT DEVICE IN A TURBULENT ENVIRONMENT

BACKGROUND OF THE INVENTION

1. Technical Field

The present invention generally relates to computer input devices and, more particularly, to methods and apparatus for operating an input device in a turbulent environment.

2. Background Information

The current trend in computer system design is to utilize a graphical user interface (GUI) for system access and control. When a computer system is configured to operate with a GUI, a system user or operator accesses and controls the functionality of the computer or specific applications thereof by manipulating a system generated pointer or cursor rendered on a display. This manipulation of the cursor is generally accomplished using a computer input device, and more common input devices include mice, light pens, trackballs, joysticks, touch pads, or the like.

The manipulation of the display cursor using one or more of these input devices is accomplished through user movement of the input device across a surface or physical manipulation of a movable or rotatable member of the device. This physical action by the operator results in a corresponding displacement of the cursor on the screen as a motion sensing component of the input device converts the action by the user into an appropriate electrical, mechanical, or optical signal that is transmitted to the computer for interpretation and subsequent action. In addition, one or more switches of the input device can be actuated by the operator to select items from a display menu or to initiate processes of the computer. While these input devices can provide significant advantages and performance enhancements for users, difficulties arise when these devices are used in an environment in which external and internal forces are likely to affect the operators' ability to accurately manipulate the input device.

One such environment in which external and internal forces are likely to affect the operators' ability to accurately manipulate the input device is in a moving vehicle. GUI use with a corresponding input device in land, sea, air, and space vehicles has provided improved functionality, data access and simplicity of use that increases operation efficiency while reducing operator workload. However, because automobiles, ships, aircraft, spacecraft, or the like are subject to external forces and disturbances that result in erratic movement of the vehicle and a corresponding jostling of the operator, undesired movement of the input device is likely to place the cursor in a location of the display that was not intended by the user. In this situation, corrective action is taken by the user to reposition the pointer to the display destination that was originally targeted. Furthermore, if the erratic movement is sustained, input device positioning of the cursor may be less than optimal and the number of repositioning actions taken by the GUI operator is likely to be greater than desired. Therefore, the benefits of GUI use in a moving vehicle may be diminished unless the effects of the external forces and disturbances are dampened or there is compensation for the turbulent environment.

BRIEF SUMMARY OF THE INVENTION

In accordance with a preferred embodiment of the present invention, an apparatus and method are provided for processing a user input that is used to drive cursor movement on a display in a vehicle that is operating in an unstable environment. The apparatus includes an input device configured to receive the user input and generate an input device output signal. The apparatus also has a sensing device that is configured to detect motion of the vehicle and generate a motion signal representing the vehicle motion. A turbulence controller is provided for receiving the input device output signal and evaluating the motion signal. The turbulence controller alters the input device output signal based at least in part upon the evaluation of the motion signal such that a compensated output signal is created for driving the cursor movement on the display.

BRIEF DESCRIPTION OF THE DRAWINGS

The subject invention will hereinafter be described in conjunction with the appended drawing figures, wherein like numerals denote like elements, and.

DETAILED DESCRIPTION OF A PREFERRED EXEMPLARY EMBODIMENT

The ensuing description is a preferred exemplary embodiment only, and is not intended to limit the scope, applicability, or configuration of the invention in any way. Rather, the ensuing descriptions will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

Figure 1:
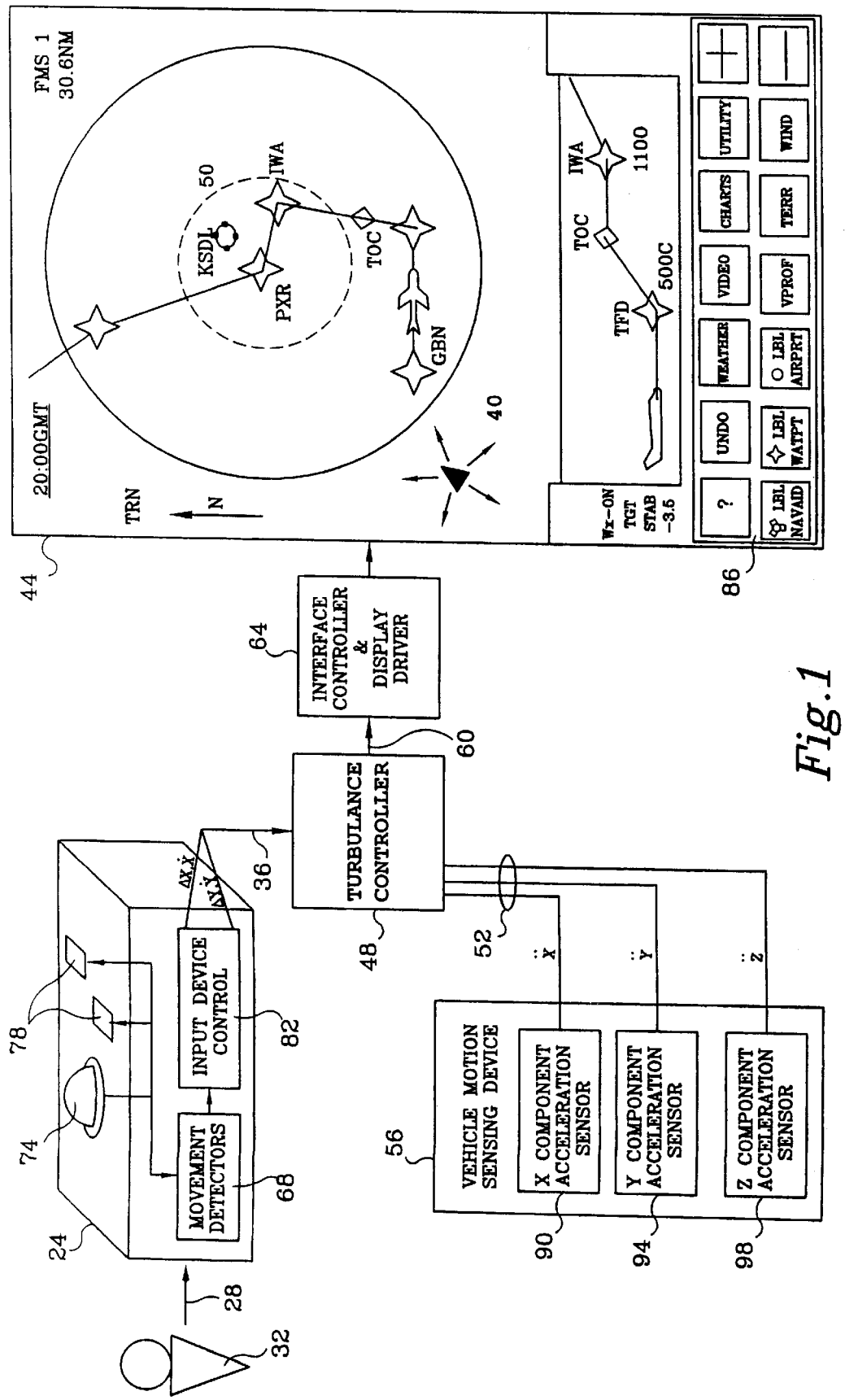
FIG. 1 is a schematic block diagram of a preferred embodiment of the present invention in the context of a graphical user interface (GUI) having an input device for access and operation of an aircraft flight control computer.

Referring to FIG. 1, a graphical user interface (GUI) system 20 according to a preferred embodiment of the present invention includes an input device 24 configured to receive an input 28 from a user 32 and generate an input device output signal 36 that represents the user's 32 selected movement of a cursor 40 on a display 44. The system 20 also includes a turbulence controller 48 that receives the input device output signal 36 and a motion signal 52 produced by a sensing device 56 and representative of the vehicle motion in which the system 20 resides. The turbulence controller 48 evaluates the motion signal 52 and generates a compensated output signal 60 that is subsequently transmitted to an interface controller and display driver 64. The interface controller and display driver 64 processes the compensated output signal 60 and issues the necessary hardware or software signals to the display 44 such that the cursor 40 is accordingly moved on the display 44.

The input device 24 facilitates communication between the user 32 and the display 44, and may comprise any appropriate device or system for controlling the display 44. In this description of a preferred embodiment, the input device 24 includes a trackball 74 and at least one button switch 78 mounted within the cockpit of an aircraft (not shown). However, the following description of an exemplary preferred embodiment using a trackball input apparatus and an aircraft as the vehicle in which the GUI system 20 is operating should be understood to be illustrative only and should not be considered to limit the input device 24 and vehicle to a trackball device and aircraft, respectively. More appropriately, it should be understood that the input device 24 may be any appropriate input system, such as a mouse, light pen, joystick, touch pad, or the like, and the mode of transportation may be a land, sea, air or space vehicle that is susceptible to external and internal forces that may affect the vehicle operators' ability to accurately manipulate the input device 24.

With continued reference to FIG. 1 and as previously indicated, the input device 24 suitably includes one or more movement sensors 68 such as optical, electrical, or mechanical sensors, to sense the movement of the trackball 74 and activation of the button switch 78. An input device controller 82 may monitor the state of the movement sensors 68 and generate the input device output signal 36 in a form that is compatible with the selected communication protocol of the system 20. The input device output signal 36 may be produced by an appropriate mechanism using any number of communication formats, for example to represent X-coordinate movement of the trackball 74, Y-coordinate movement of the trackball 74, and activation/deactivation of the button switches 78. While the input device output signal 36 is conventionally directly presented to the interface controller and display driver 64 for control of the cursor 40 across the display 44, the GUI system 20 according to various aspects of the present invention provides the input device output signal 36 to the turbulence controller 48 that is also suitably receiving motion information detected by the motion sensing device 56.

The motion sensing device 56 senses movement associated with the input device 24. In the present embodiment, the motion sensing device 56 suitably contains an X-component acceleration sensor 90, AY-component acceleration sensor 94 and AZ-component acceleration sensor 98 for detecting the vehicle's acceleration in the X, Y, and Z planes, respectively. The acceleration sensors 90, 94, 98 may be of any type, including, but not limited to, spring restrained pendulous accelerometers, torque balance pendulous accelerometers, or solid state accelerometers. Each of the sensors 90, 94, 96 perceives the vehicle's acceleration and generates an acceleration reading that is suitably provided as a combined motion signal 52 to the turbulence controller 48 for evaluation and compensation of the input device output signal 36.

Figure 2:
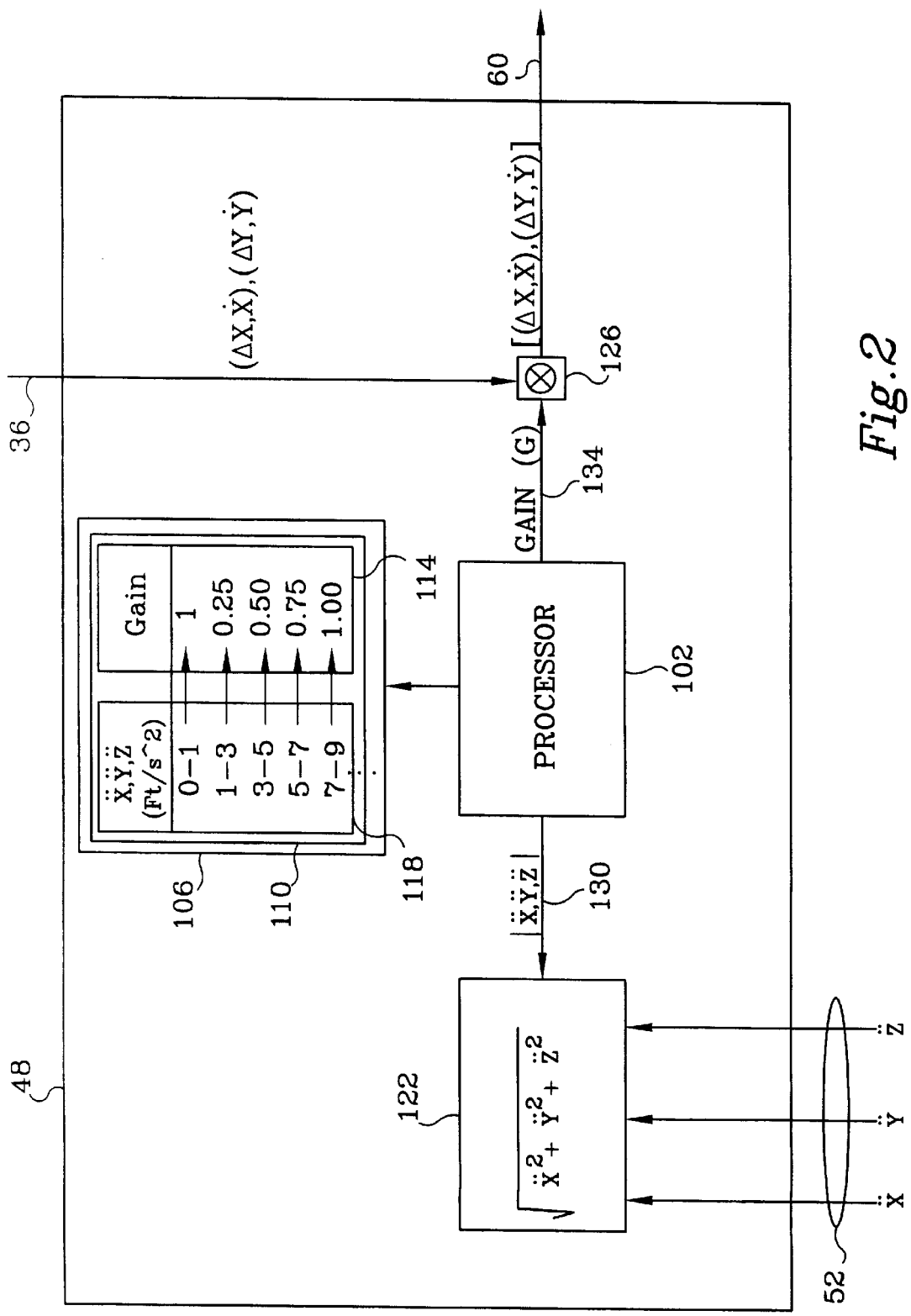
FIG. 2 is schematic block diagram of a turbulence controller according to a preferred embodiment of the present invention.

The turbulence controller 48 generates a compensated output signal 60 based on the input device output signal 36 and the combined motion signal 52. The turbulence controller may comprise any suitable system for generating the compensated output signal 60, such as a controller, a hardwired circuit, a dedicated chip, a logic array, or another suitable system. An exemplary turbulence controller 48 is shown in greater detail in FIG. 2. Referring to FIG. 2, the turbulence controller 48 suitably includes: a processor 102; a memory 106 having a data structure 110 relating gain data objects 114 to acceleration magnitude data objects 118; an acceleration magnitude determinator 122; and a multiplier 126. During turbulence controller 48 operation, the acceleration magnitude determinator 122 receives the motion signal 52 and calculates the magnitude of the vehicle's acceleration. The processor 102 retrieves the magnitude of the vehicle's acceleration from the acceleration magnitude determinator 122 and accesses the memory 106 for selection of a correspondence gain data object 114 based upon the acceleration magnitude as calculated by the acceleration magnitude determinator 122.

In the present embodiment, the selection of the gain by the processor 102 is accomplished using a table lookup operation of the data structure 110 stored in the memory 106. More specifically, the acceleration magnitude retrieved by the processor 102 is compared with the acceleration magnitude data objects 118 until an acceleration magnitude range containing the calculated acceleration magnitude is found. Once the proper acceleration magnitude range is identified, a selected gain 134 for the identified acceleration range is selected from the gain data objects 114 based on the selected accelaration magnitude data object 118. This selected gain 134 is presented to multiplier 126 that is also receiving the input device output signal 36.

Multiplication of the input device output 36 by the selected gain 134 alters the input device output signal 36. The resulting compensated output signal 60 is presented to the interface controller and device driver 64 for proper control of the cursor. This allows the scaling factor or sensitivity of the input device 24 to be automatically and dynamically adjusted by filtering or modifying the input device output signal 36 before it is translated into cursor motion on the display 44. In this way, the cursor moves to a lesser degree if the motion signal 52 indicates significant acceleration, causing the turbulence controller 48 to reduce the gain. Therefore, operation of the input device 24 is dampened during periods of erratic vehicle movement that are likely to result in a jostling of the user 32 and a corresponding movement of the input device 24 that places the cursor in an unintended location of the display 44. However, as it should be understood, the apparatus for operating the input device 24 in a turbulent environment as presented may be modified in a wide variety of ways.

For example, each acceleration component (i.e, X-component, Y-component, and Z-component) may be individually evaluated and only the corresponding component of the input device output signal 36 would be altered. Furthermore, as the movement of the cursor may be two dimensional (e.g, X-Y), the acceleration components of the two dimensional coordinate system (e.g., X-component acceleration and Y-component acceleration) may be individually combined with the third acceleration component (e.g., Z-component) to select an appropriate modification of the input device output signal 36 as movement of the vehicle in the third dimension may cause erratic user movement of the input device in both of the other two directions (e.g., X and Y). In addition, the gain may be selected according to any suitable method or criteria. For example, the memory 106 of the turbulence controller 48 may contain empirically or experimentally derived data that relates any number of vehicle movements, duration of the movement, or any other quantity corresponding to acceleration of the user 32 or the input device 24 to a gain or delta value that compensates for the movement of the input device 24 due to this vehicle movement. Each of these various changes and other modifications not specifically mentioned may be made in the function and arrangement of elements described without departing from the spirit and scope of the invention. Furthermore, the method for operating an input device in a turbulent environment also provides for these various changes and modifications and the following method should not to be construed as limiting the order in which the individual process steps may be performed and the exemplary process may include more or less steps or may be performed in the context of a larger processing scheme.

Figure 3:
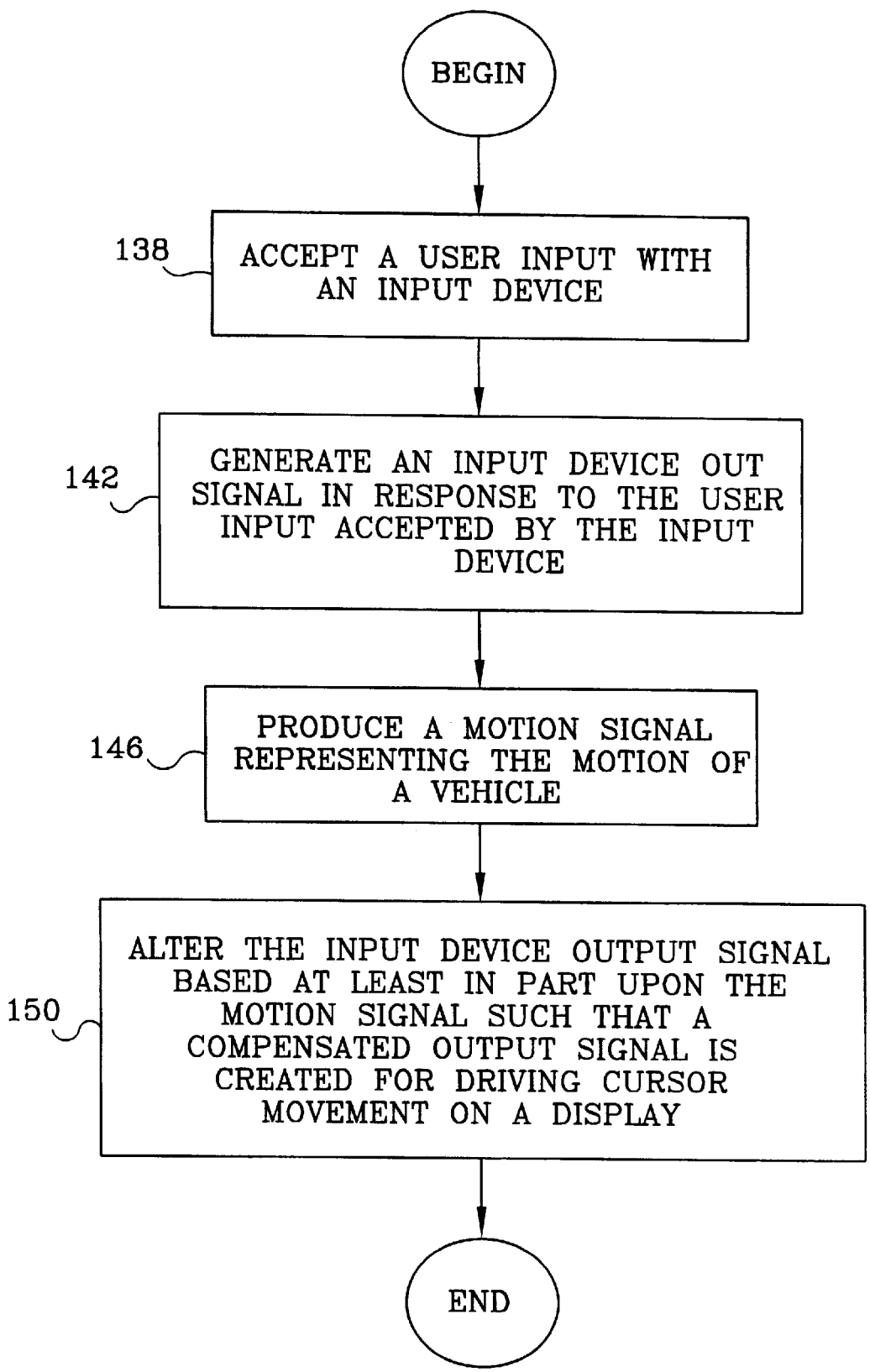
FIG. 3 is a flowchart setting forth an exemplary method for operating an input device in a turbulent environment according to a preferred embodiment of the present invention.

Referring to FIG. 3, an exemplary method for operating an input device in a turbulent environment is presented according to a preferred embodiment of the present invention. Initially, a user input is accepted by an input device (Step 138) and an input device output signal is generated in response to the user input accepted by the input device (Step 142). A motion signal representing the motion of a vehicle is produced (Step 146) and the input device output signal is altered based at least in part upon the motion signal such that a compensated output signal is created that for driving cursor movement on a display (Step150).

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. An apparatus for processing a user input that is used to drive cursor movement on a display in a vehicle that is operating in a turbulent environment, comprising the steps of:

an input device configured to receive the user input and generate an input device output signal;

a sensing device configured to detect motion of the vehicle and generate a motion signal representing said motion of the vehicle; and a turbulence controller receiving said input device output signal and evaluating said motion signal, said turbulence controller altering said input device output signal based at least in part upon said evaluation of said motion signal such that a compensated output signal is created for driving the cursor movement on the display.

2. The apparatus of claim 1, further comprising an interface controller and display driver for processing said motion signal and issuing commands to the display such that the cursor is moved on the display.

3. The apparatus of claim 1, further comprising a movement sensor and a input device controller, said movement sensor sensing movement of said input device and said input device controller reading the state of said movement sensor in order to assist in the production of said input device output signal.

4. The apparatus of claim 1, wherein said input device output signal represents X-coordinate movement and Y-Component movement of said input device.

5. The apparatus of claim 1, wherein said sensing device includes an acceleration sensor for detecting the acceleration of the vehicle.

6. The apparatus of claim 1, wherein said sensing device includes a plurality of acceleration sensors for detecting the acceleration components of the vehicle in multiple axes.

7. The apparatus of claim 1, further comprising a magnitude determinator receiving said motion signal from said sensing device and calculating a magnitude of said motion of the vehicle.

8. The apparatus of claim 7, further comprising a processor retrieving said magnitude of said motion of the vehicle and selecting a gain based thereon.

9. The apparatus of claim 1, wherein said input device is a trackball.

10. The apparatus of claim 1, wherein said input device is a mouse.

11. The apparatus of claim 1, wherein said input device is a touch pad.

12. The apparatus of claim 1, wherein said input device is a light pen.

13. A method of processing a user input that is used to drive cursor movement on a display in a vehicle that is operating in a turbulent environment, comprising the steps of:

(a) accepting the user input with an input device;

(b) generating an input device output signal in response to the user input accepted with said input device;

(c) producing a motion signal representing the motion of the vehicle in the turbulent environment; and (d) altering said input device output signal based at least in part upon said motion signal such that a compensated output signal is created for driving the cursor movement on the display.

14. The method of claim 13, further comprising the step of processing said motion signal and issuing commands to the display such that the cursor is moved on the display.

15. The method of claim 13, wherein step (c) includes detecting the acceleration of the vehicle.

16. The method of claim 13, wherein step (c) includes detecting the acceleration of the vehicle in multiple axes.

17. The method of claim 13, further comprising the step of calculating a magnitude of the motion of the vehicle represented by said motion signal.

18. The method of claim 17, further comprising the step of retrieving said magnitude and selecting a gain based thereon.

* * * * *